Figure 1:
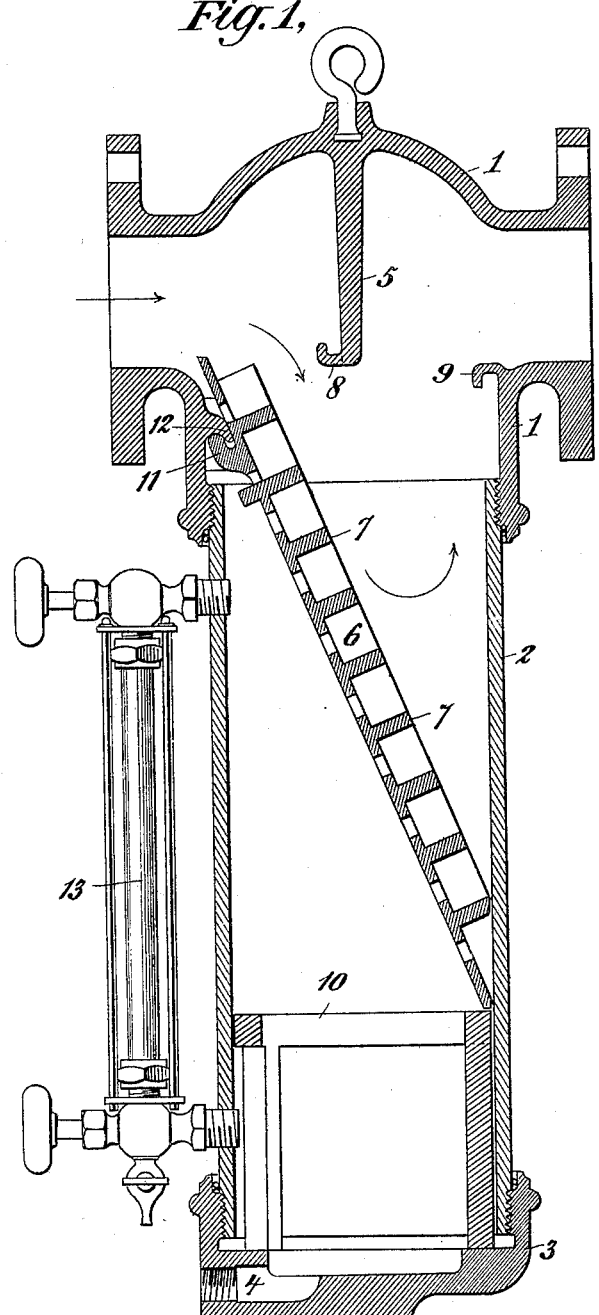

No. 622,757. Patented Apr. 11, 1899.
R. C. CARPENTER.
STEAM SEPARATOR.
(Application filed June 8, 1898.)

(No Model.) 2 Sheets—Sheet 1.

WITNESSES:
O. N. Haywood
N. Wetterling

INVENTOR
Rolla C. Carpenter
BY
E. N. Marble & Sons
ATTORNEYS

No. 622,757. Patented Apr. 11, 1899.
R. C. CARPENTER.
STEAM SEPARATOR.
(Application filed June 8, 1898.)
(No Model.) 2 Sheets—Sheet 2.
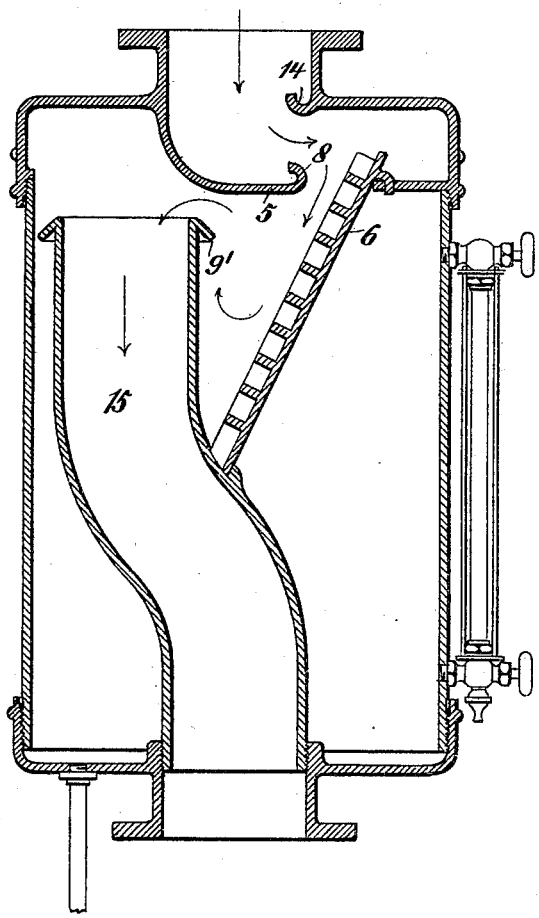
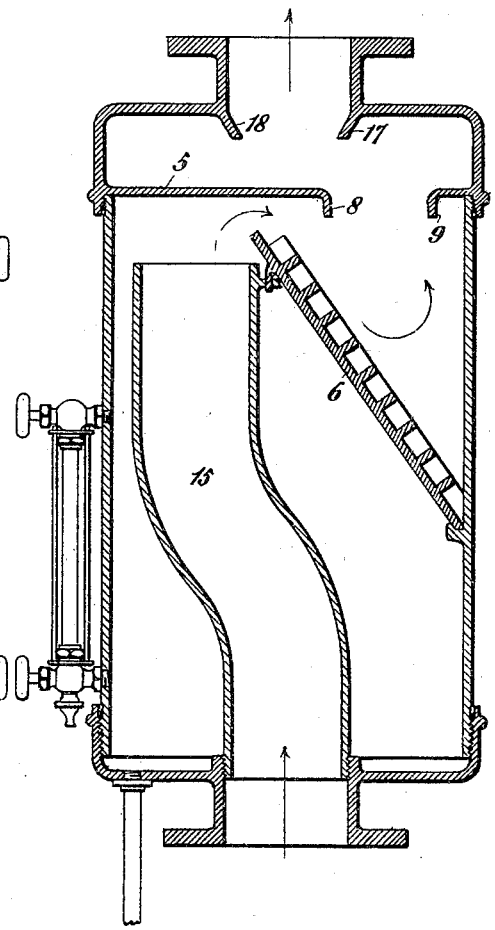
WITNESSES:
D. H. Naylor
N. Wetterling
INVENTOR
Rolla C. Carpenter
BY
E. M. Marble & Son
ATTORNEYS

United States Patent Office.

ROLLA C. CARPENTER, OF ITHACA, NEW YORK, ASSIGNOR TO SCHAFFER & BUDENBERG, OF NEW YORK, N. Y.

STEAM-SEPARATOR.

SPECIFICATION forming part of Letters Patent No. 622,757, dated April 11, 1899.

Application filed June 8, 1898. Serial No. 682,888. (No model.)

*To all whom it may concern:*

Be it known that I, ROLLA C. CARPENTER, a citizen of the United States, residing at Ithaca, in the county of Tompkins and State of New York, have invented certain new and useful Improvements in Steam-Separators; and I do hereby declare the following to be a full, clear, and exact description of the invention, such as will enable others skilled in the art to which it appertains to make and use the same.

My invention relates to steam-separators such as are used for freeing steam from water or condensed vapor, oil, and other fluids and which may be used for freeing any gas from liquid carried mechanically by it.

My invention consists in the novel combination, construction, and arrangement of the parts of the separator.

The object of my invention is to provide a separator capable of freeing steam and other gases from liquids carried mechanically by them more efficiently than former separators, which shall be simple, comparatively cheap in construction, and which shall prevent reabsorption of the liquid separated from the steam by said steam. This object is attained in the separator herein described, and illustrated in the drawings which accompany and form a part of this specification, in which the same reference-numerals indicate the same or corresponding parts, and in which—

Figure 2:
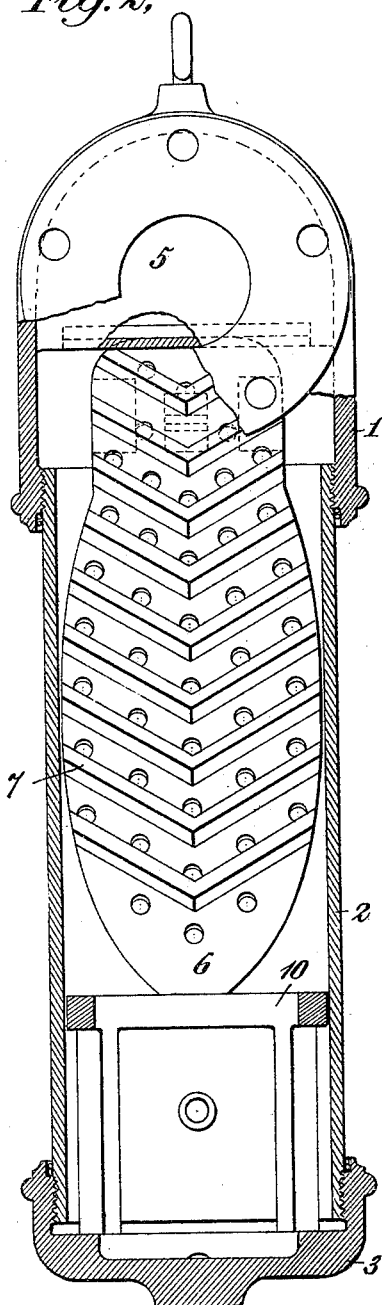

Figure 1 is a longitudinal vertical section, and Fig. 2 a transverse vertical section, of a separator designed to be attached to horizontal pipes. Figs. 3 and 4 are vertical sections of separators designed to be used in vertical pipes, the separator shown in Fig. 3 being intended for pipes in which the steam flows downwardly and the separator shown in Fig. 4 being intended for pipes in which the steam flows upwardly.

The separators herein illustrated and described consist each of a casing containing a steam-chamber with entrance and exit openings and a receptacle for the liquid separated from the steam, which liquid-receptacle is preferably separated from the steam-chamber by a screen, preferably inclined and so placed that the entering steam, directed away from the exit-opening by a suitable deflector, passes along and over said screen. This screen is preferably provided with a series of ridges which intercept water or other liquid carried by the steam, such liquid passing downward into the liquid-receptacle through perforations between the ridges. Projections are also provided which engage the steam-current at those points where for any reason, such as a change in direction of the current, a considerable portion of the liquid carried by the steam will be upon the outside of the current, which projections intercept such liquid and direct it downward into the liquid-receptacle.

Referring first to Figs. 1 and 2 of the drawings, which show a separator intended to be placed in pipes which are substantially horizontal, 1, 2, and 3 are sections which together form the casing of the separator, 1 being similar to a T-coupling, 2 a cylindrical casing screwing into or otherwise connected to the lower opening of the section 1, and 3 a cap closing the lower end of section 2 and provided with an opening 4, into which a drainage-pipe may be fitted. Within the section 1 is a downwardly-extending partition 5, which prevents the direct passage of steam from the entrance-opening to the exit-opening and deflects it downward, for which reason the partition 5 may be termed a "deflector."

Beneath the deflector 5 and extending transversely across the section 2 of the separator is an inclined screen or grating 6, placed at such angle that the steam directed downward by the deflector 5 will pass along and over it. This screen or grating 6 is provided with a number of transverse inclined projecting ridges 7, which intercept water or other fluid carried by the steam and cause it to pass downward into the lower portion of the casing 2 through openings in the screen or grating between the ridges. The top of the screen 7 is not flush with the bottom of the section 1 nor does the screen lie directly against the wall of said section. It extends slightly above the bottom of section 1 and is separated therefrom by a narrow passage. This construction is employed for the purpose of intercepting water flowing along the bottom of the steam-pipe. It is well known that water carried by steam passing through a horizontal pipe is not uniformly distributed through the cross-section of the pipe, but that a considerable portion of such water flows along the bottom. All such water will be intercepted by the projecting upper end of the screen 6 and will pass downward through spaces left at the sides of the screen into the lower portion of the section 2. When the steam-current changes direction upon encountering the deflector 5, a considerable portion of the water or other fluid carried by it will be projected against the deflector 5 or will be carried to the outside of the steam-current. Such water is intercepted by a backwardly-extending projection 8 upon the lower end of the deflector, which forms a trough open at the ends, so that water caught by it will pass out at the ends and will fall into the lower portion of the section 2. A similar backwardly-extending projection 9 is provided near the exit-opening to intercept such liquid as may remain in the steam after passing over the screen 6 and which will be thrown to the outside of the current of steam when said current changes direction after passing under the deflector 5. As the steam is then flowing upward the projection 9 is a reversed trough; but water caught by it will trickle down the side of the casing 2.

The screen 6 is supported within the separator by a skeleton support 10, resting upon the bottom section 3. It is steadied at the top by a lip 11, engaging a corresponding lip 12, projecting from the section 1.

The separator may be provided with an ordinary gage-glass 13 to indicate the height of the liquid within it. The flow of liquid from the separator may be controlled by an ordinary cock or by a steam-trap, neither of which is shown.

The screen 6 serves not only to intercept water carried by the steam and directed downward, but also to prevent the steam from passing over the surface of the liquid contained within the water-well of the separator. When the steam is allowed to pass over the surface of the liquid within the separator, some reabsorption of such liquid is apt to take place, and it is of course desirable that such reabsorption should be prevented.

Figs. 3 and 4 show how the construction of the separator is modified to adapt it to be placed in vertical pipes. The principle of operation of the separators shown in these figures is the same as that of the separator shown in Figs. 1 and 2; but changes in the proportions and arrangement of the parts are necessary in order to adapt the construction to the different direction of flow of steam.

Fig. 3 shows the construction employed for a vertical pipe in which the steam flows downwardly. In this case the deflector 5 directs the steam to one side, causing it to pass downwardly and along the screen 6 in order to reach the exit-opening, which is at the top of a stand-pipe 15, beneath the deflector. The screen 6 is similar in construction to the screen of the separator shown in Figs. 1 and 2. The deflector 5 is provided with a rearwardly-extending projection 8 to catch water upon the lower side of the current of steam, and above this projection 8 is a similar projection 14, which intercepts water upon the upper side of the current. At the top of the stand-pipe 15 is a collar 9', corresponding to the projection 9 of Fig. 1, and which serves to catch any further water remaining in the steam after it has passed over the screen 6.

Fig. 4 shows a form of separator employed for vertical pipes in which the steam passes upward. In this case the entrance-opening is at the top of the stand-pipe 15, and the deflector 5 extends over this opening, thus causing the steam to pass downwardly. The end of the screen 6 projecting above the top of the stand-pipe 15 intercepts water upon one side of the current of steam, and the projection 8 of the deflector 5, which projection need not in this case extend backwardly with respect to the current of steam, intercepts water upon the other side of said current. The screen 6 is similar in construction to the screen of the separators hereinbefore described.

A downwardly-extending projection 9 is provided to catch water remaining in the steam after passing over the screen, and two other similar projections 17 and 18 are provided at the exit-opening, which serve the same purpose.

The operation of all of these separators may be understood from the description of the operation of the separator shown in Figs. 1 and 2. Steam entering at the left of Fig. 1 encounters the deflector 5 and is directed downwardly over the surface of the screen 6. Water carried by the steam and flowing along the bottom of the pipe is intercepted by the upper end of the screen 6, while water thrown to the outside of the current when the change in direction takes place opposite the deflector 5 is intercepted by the projection 8. Other water carried by the steam is intercepted by the ridges of the screen 6 as the steam passes along and over said screen, because such water is thrown downward with respect to the current of steam, and any further water remaining in the steam is intercepted by the projection 9 before said steam passes out through the exit-opening at the right of Fig. 1.

While this separator is intended, primarily, for separating water and oil from steam and is referred to herein as a "steam-separator," it will of course be understood that the separator is equally adapted for separating any liquid from any gas moving with considerable velocity.

Having thus completely described my invention, what I claim, and desire to secure by Letters Patent, is—

1. In a steam-separator, the combination, with a casing containing a steam-chamber and a liquid-receptacle, and a screen above said liquid-receptacle, of means for deflecting the entering steam-current, and a hooklike projection located at a point beyond that at which the entering steam-current changes direction, and adapted to engage said entering current upon the outer side thereof, so as to intercept liquid thrown to the outside of the current during such change of direction, substantially as described.

2. In a steam-separator, the combination, with a casing containing a steam-chamber and a liquid-receptacle, and an inclined screen above said liquid-receptacle extending diagonally across said steam-chamber, and provided with projections adapted to intercept liquid carried by the steam, of a deflector which directs entering steam away from the exit-opening, and causes said steam to pass along and over said screen, substantially as described.

3. In a steam-separator, the combination, with a casing containing a steam-chamber and a liquid-receptacle, and a screen above said liquid-receptacle, provided with projections extending from one side of the screen to the other, and adapted to intercept liquid carried by the steam, of a deflector which directs entering steam away from the exit-opening, and causes it to pass along and over said screen, and is provided with a projection, located at a point intermediate between that at which the steam changes direction and the screen, adapted to intercept liquid thrown to the outside of the steam-current during such change of direction, substantially as described.

4. In a steam-separator, the combination, with a casing containing a steam-chamber and a liquid-receptacle, and a screen above said liquid-receptacle, of means for deflecting the entering steam-current, a projection located at a point beyond that at which the entering steam-current changes direction, and adapted to engage said entering current upon the outer side thereof, so as to intercept liquid thrown to the outside of the current during such change of direction, and another projection on the opposite side of the steam-current, likewise adapted to intercept liquid carried by the steam, substantially as described.

5. In a steam-separator, the combination, with a casing containing a steam-chamber and a liquid-receptacle, and an inclined screen above the liquid-chamber, and provided with projections adapted to intercept liquid carried by the steam, the upper end of said screen projecting into the steam-current to intercept liquid carried thereby, of a deflector which directs entering steam away from the exit-opening, and causes it to pass along and over said screen, substantially as described.

6. In a separator, the combination, with a casing having entrance and exit openings, and a deflector which directs entering steam away from the exit-opening, of backwardly-extending projections which engage the opposite sides of the entering steam-current as it passes said deflector, and intercept liquid carried by the steam, substantially as described.

7. In a separator, the combination, with a casing having entrance and exit openings, and a deflector which directs entering steam away from the exit-opening, of backwardly-extending projections which engage the opposite sides of the entering steam-current as it passes said deflector, and intercept liquid carried by the steam, and another similar projection near the exit-opening, substantially as described.

8. In a separator, the combination, with a casing containing a steam-chamber, with entrance and exit openings in the sides thereof, and a liquid-receptacle beneath said openings, and an inclined screen projecting above the bottom of the entrance-opening, so as to intercept liquid carried by the steam, of a deflector which directs entering steam away from the exit-opening and causes said steam to pass along and over said screen, substantially as described.

9. In a separator for removing liquids from steam and other gases, the combination, with a casing containing a steam-passage and a liquid-receptacle beneath said passage, of an inclined screen placed beneath the steam-passage and above the liquid-receptacle, and projecting partly across the steam-passage, so as to intercept liquid carried by the steam, substantially as described.

In testimony whereof I affix my signature in presence of two witnesses.

ROLLA C. CARPENTER.

Witnesses:
JOHN H. SOUTHWORTH,
S. E. BANKS.